United States Patent [19]
Berger et al.

[11] Patent Number: 5,170,769
[45] Date of Patent: Dec. 15, 1992

[54] SYSTEM FOR CONTROLLING AN INTERNAL COMBUSTION ENGINE IN A MOTOR VEHICLE

[75] Inventors: Joachim Berger, Winterbach; Reinhard Fenchel, Calw-Altburg; Thomas Küttner, Stuttgart; Dieter Seher, Ilsfeld; Klaus Bleuel, Östrich-Winkel-1, all of Fed. Rep. of Germany

[73] Assignee: Robert Bosch GmbH, Stuttgart, Fed. Rep. of Germany

[21] Appl. No.: 653,163

[22] Filed: Feb. 11, 1991

[30] Foreign Application Priority Data

Feb. 10, 1990 [DE] Fed. Rep. of Germany ....... 4004086

[51] Int. Cl.⁵ .............................................. F02D 7/00
[52] U.S. Cl. .................................... 123/688; 123/690; 123/691; 123/399
[58] Field of Search ............... 123/399, 478, 350, 352, 123/445, 480, 486, 688, 690, 691

[56] References Cited

U.S. PATENT DOCUMENTS

| | | |
|---|---|---|
| 4,603,675 | 8/1986 | Junginger et al. |
| 4,693,111 | 9/1987 | Arnold et al. |
| 4,988,428 | 1/1991 | Iwakiri et al. ............... 204/406 |
| 5,025,767 | 6/1991 | Kuma et al. .................. 123/691 |
| 5,070,847 | 12/1991 | Akiyama et al. ............. 123/690 |
| 5,080,072 | 1/1992 | Hosokai et al. .............. 123/688 |
| 5,090,389 | 2/1992 | Ooma ........................... 123/690 |

FOREIGN PATENT DOCUMENTS

| | | |
|---|---|---|
| 3621937 | 1/1988 | Fed. Rep. of Germany. |
| 002974 | 2/1987 | Japan ............................ 123/691 |

Primary Examiner—Raymond A. Nelli
Attorney, Agent, or Firm—Walter Ottesen

[57] ABSTRACT

The invention is directed to a system for electronically controlling (open loop and/or closed loop) an internal combustion engine of a motor vehicle. By means of at least one measuring unit at least one signal is generated representing the position of a power-determining component and the measuring unit comprises several sensors. The measuring unit is associated with a power-determining component of the vehicle such as a throttle flap or the control rod and/or accelerator pedal. The sensors are checked with respect to their functional capability by comparing the signal values generated by the sensors to each other with respect to a pregiven tolerance range. When a fault of one or more of the sensors is detected, then that sensor or those sensors which is or are unaffected can be determined.

15 Claims, 3 Drawing Sheets

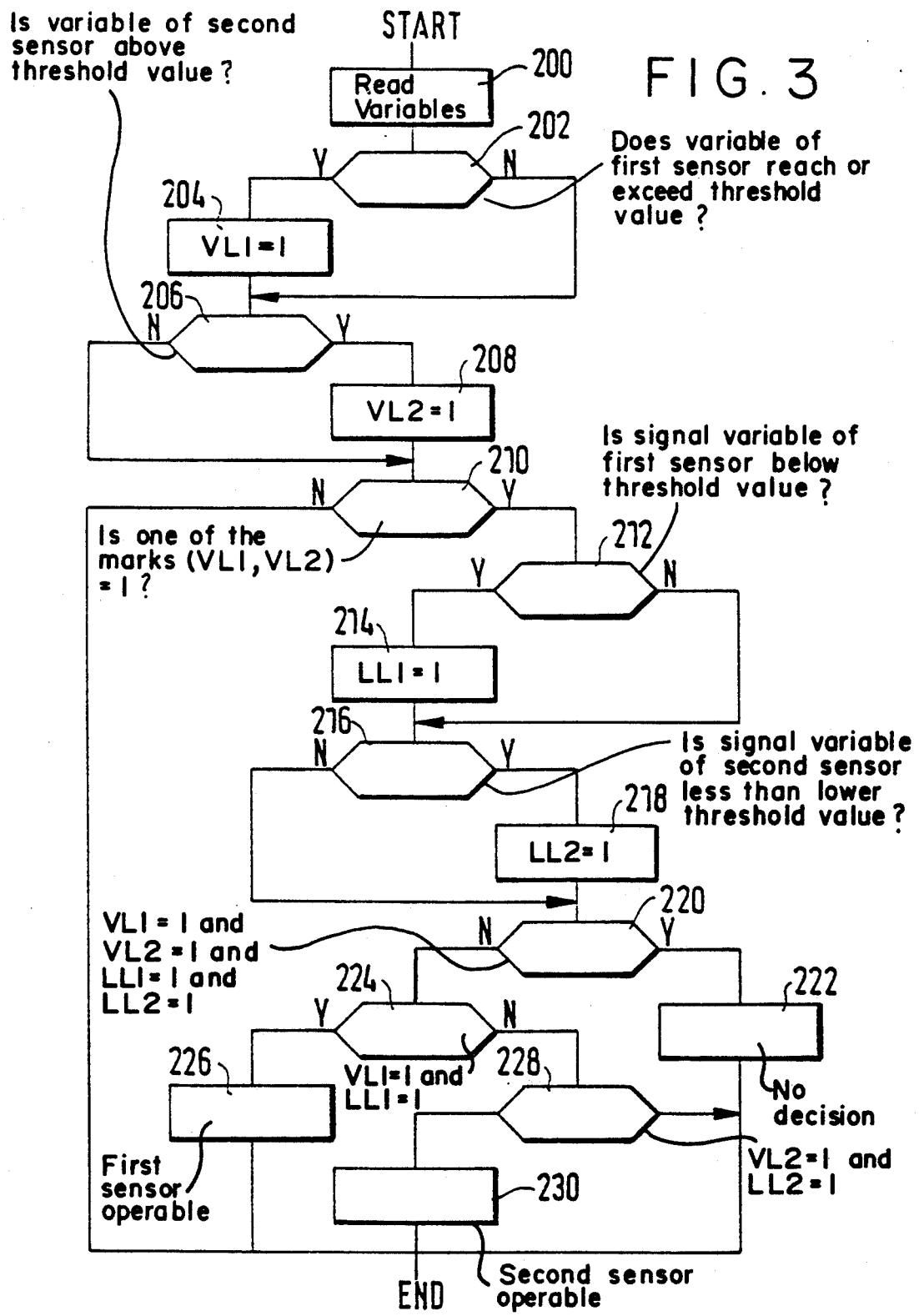

SYSTEM FOR CONTROLLING AN INTERNAL COMBUSTION ENGINE IN A MOTOR VEHICLE

FIELD OF THE INVENTION

The invention relates to a system for the open-loop and closed-loop control for an internal combustion engine in a motor vehicle.

BACKGROUND OF THE INVENTION

A system of the kind referred to above is disclosed in United States patent application Ser. No. 165,276, filed Feb. 26, 1988. Here, an electronic control arrangement in a motor vehicle is described which is equipped with an arrangement for monitoring measuring units which detect operating parameters of the engine and/or of the motor vehicle. These measuring units are checked with respect to their function by evaluating the signal variables supplied thereby. Fault conditions of the particular measuring unit are detected by comparing the signal variables supplied by the measuring units with pregiven limit values. A check of the signal variable with respect to its limit values pregiven by the supply voltage takes place. The check is explained with respect to an electronic accelerator pedal taken as an example.

A procedure of the kind described above has the disadvantage that the following cannot be detected: shunt faults of the signal line of the measuring unit to the poles of the supply voltages; interruptions with stray resistance to the poles of the supply voltages; and, nonlinearities of the measuring unit. Accordingly, operational reliability of a system equipped with such a measuring unit cannot be ensured.

SUMMARY OF THE INVENTION

It is an object of the invention to provide measures which ensure a complete operational reliability of a system of the kind referred to above. This is achieved in that measuring units are provided which comprise a plurality of sensors each of which detects one operating parameter of the internal combustion engine such as the position of a power-determining component assigned thereto. The sensors are checked with respect to their operational capability by comparing the signal variables generated thereby with each other to a pregiven tolerance range.

U.S. Pat. No. 4,603,675 discloses a monitoring arrangement for an electronically controlled throttle flap in a motor vehicle. Measuring units are connected, for example, to the accelerator pedal of an electronic accelerator pedal system and, in one embodiment, these measuring units comprise a position transducer potentiometer and a monitoring potentiometer. The position signal supplied by the position transducer potentiometer is compared in a logic unit to threshold values determined from the signal of the monitoring potentiometer and, the function of the measuring unit is checked by means of the signal variable of the position transducer potentiometer in comparison to the threshold values. This procedure however ensures only that the measuring unit is monitored at one point of its value range with especially nonlinearities and/or shunt faults between the position transducer potentiometer and the supply voltage and between the monitoring potentiometer and the supply voltage not being detected.

The procedure provided by the invention for checking the functional capability of the sensors by evaluating the signal values each representing one operating parameter such as a position affords the advantage that a complete operational reliability of the measuring unit and of the control system connected thereto is ensured. The mutual comparison of the signal values of the sensors to a pregiven tolerance band, which is provided over the entire signal range of the sensors, makes possible the detection of: shunt faults of the signal lines of the measuring unit to the poles of the supply voltage; interruptions having stray capacitance to the poles of the supply voltages; and/or nonlinearities of the measuring unit. A shunt fault in the above context is characterized as a short circuit-like connection having a finite transfer resistance.

The false detection of fault functions of at least one of the sensors is avoided in that a pregiven number of checks of the signal values with a detected fault condition must take place in a pregiven time until such a fault condition is determined. A fault detection and the emergency measures associated therewith, as may be required for the engine, takes place only when the corresponding fault function occurs with a specific frequency per time interval.

In addition to checking the operational capability of the sensors, the possibility is present to determine which of the sensors is affected by the operational disturbance by comparing the signal values and to continue the system function based on those sensors not affected. This takes place in an especially advantageous manner in that the signal values of each sensor are compared to an upper and lower threshold value in the vicinity of the value range limit and, when a threshold value is reached or exceeded, the particular sensor is determined as being functionally operable.

An advantageous application of the procedure provided by the invention is in connection with the position transducers for a power-determining position component and/or an operating element actuated by the driver of the motor vehicle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
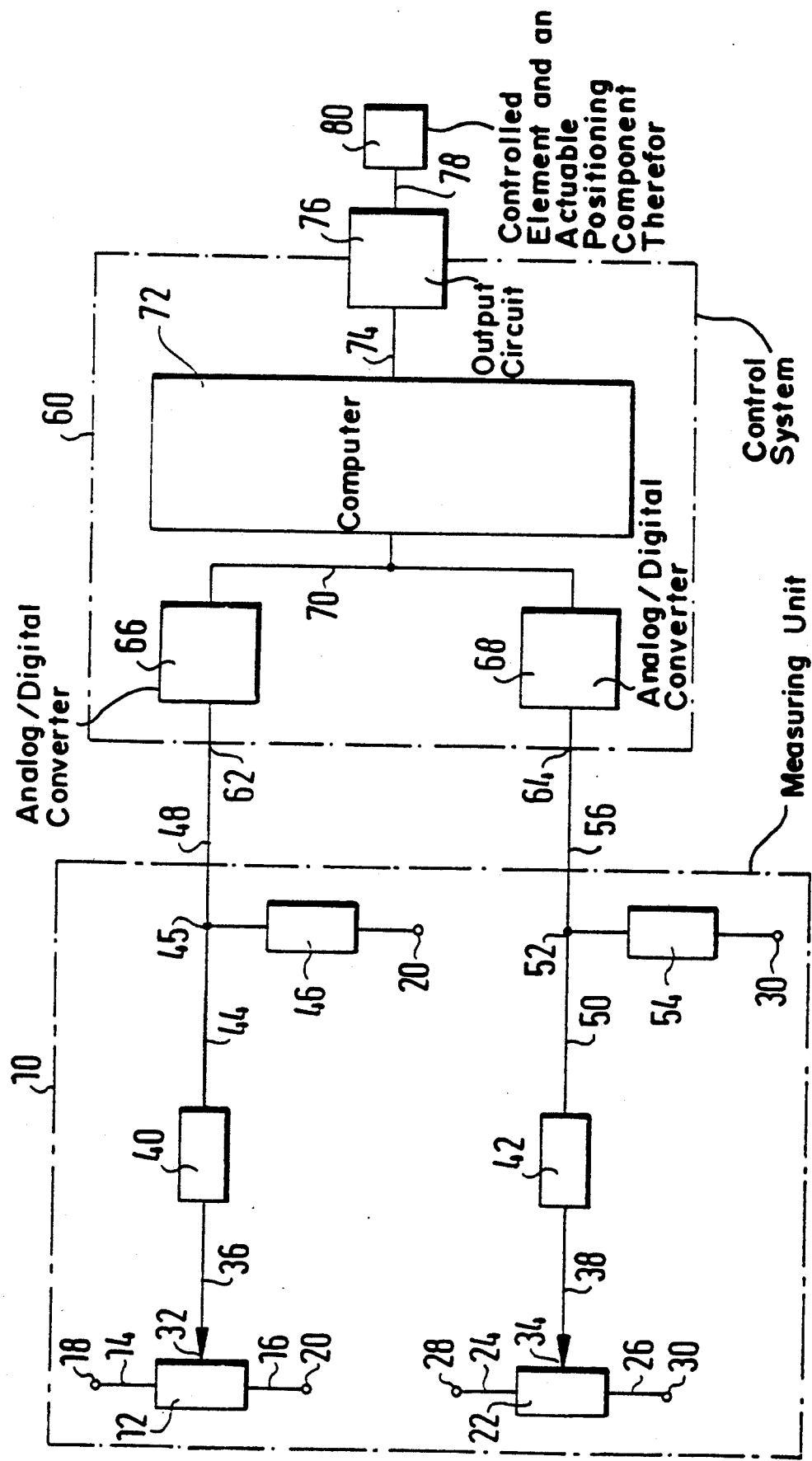
FIG. 1 is a block diagram of a position-measuring arrangement with the block diagram of a control system for an internal combustion engine.

FIG. 1 shows a measuring unit 10 for detecting the position of a power-determining component in a motor vehicle such as an accelerator pedal or a throttle flap or control rod of an electronic accelerator pedal system as well as a control (open loop or closed loop) system 60.

In a preferred embodiment of the invention, the measuring unit 10 comprises a first sensor 12 determining the position of the power-determining component with the sensor 12 being connected via its connecting lines 14 and 16 to the two poles 18 and 20 of a supply voltage. The measuring unit 10 also includes a second sensor 22 detecting the position of the same component and this sensor is connected via connecting lines 24 and 26 to poles 28 and 30, respectively, of a supply voltage. The two sensors are preferably resistance tracks defining individual potentiometers. The two sensors include respective wipers 32 and 34 connected to the particular power-determining component. The wipers 32 and 34 are connected with respective resistances 40 and 42 via corresponding lines 36 and 38.

The resistance 40 is further connected via the connecting line 44 to the connecting node 45. A resistor 46 is connected from node 45 to the pole 20 of the supply voltage, while, on the other hand, a line 48 connects the control system 60 to the measuring unit 10. In the same manner, the resistance 42 is connected via line 50 to the connecting node 52 and a resistor 54 is connected at one end thereof to this node and, with its other end, to the pole 30 of the supply voltage. A line 56 is connected to the connecting node 52 and this line connects the measuring unit 10 to the control system 60.

The connecting lines 48 and 56 are connected to inputs 62 and 64, respectively, of the control system 60 with the input 62 corresponding to a first analog/digital converter 66 and the input 64 corresponding to a second analog/digital converter 68. Both converters are connected via line 70 to a computer or processing unit 72. The line 74 is an output line of the processing unit 72 and it connects the processing unit 72 with the output stage or output circuit 76. The circuit 76 is further connected to an arrangement 80 via the drive line 78. In a preferred embodiment of the electronic engine power control, the arrangement 80 constitutes a controlled element such as a throttle flap or control rod provided with an electrically actuable positioning component.

The division between the, measuring unit 10 and the control system 60 can be made in a manner other than that shown in FIG. 1. For example, the analog/digital-converters and/or the computer unit 72 can define a physical component together with the measuring unit 10 in that the resistors 40, 42, 46 and 54 are associated with the control system 60. In one embodiment, the division is configured in that the resistors 46, 54 are accommodated in the control system 60. Furthermore, the possibility is provided that the sensors of the measuring unit 10 are configured in digital form as increment transducers.

In addition to the control of the engine power described in the above embodiment of the invention, the control system 60 comprises further functions (fuel metering, ignition control) which are not described here in order to maintain clarity with respect to the embodiment shown in FIG. 1.

The functional description of the arrangement shown in FIG. 1 is, as an example, applied to an electronic accelerator pedal system with the measuring unit 10 acting as the pedal value transducer; that is, the transducer detects the position of the element actuable by the driver. An analog measuring unit can be provided also for the throttle flap or control rod of the engine.

The wipers 32 and 34 are connected to the accelerator pedal and correspond to the first and second sensors 12 and 22, respectively. The wipers 32 and 34 move in the same direction in dependence upon the change of position of the accelerator pedal. The wipers 32 and 34 take up the voltage values represented by the position of the accelerator pedal. These voltage values are conducted by respective lines (36, 44) and (38, 50) via respective resistors 40 and 42 to the connecting nodes 45 and 52, respectively. The voltage across resistor 46 forms the signal variable of the measuring unit 10 on the line 48 and the voltage across resistor 54 defines the signal variable of the measuring unit on line 56. These analog signal variables are a direct measure for the position of the accelerator pedal.

The analog signal variables are converted in the analog/digital-converters into a digital position variable of the accelerator pedal and are transmitted via the line 70 to the computer unit 72 of the control system 60. In addition to the steps described in FIGS. 2 and 3, this computer unit 72 carries out computations for controlling the power of the internal combustion engine. An output signal is generated in dependence upon the position variables supplied by the first and second sensors 12 and 22 and in dependence upon additional measured variables of the engine (not shown in FIG. 1) such as engine speed, throttle flap position or control rod position, battery voltage, ASR/MSR-measured variables and the like. This output signal appears on line 74 and drives the unit 80 via the circuit 76 in such a manner that the engine power or the position of the throttle flap or control rod takes on the position desired by the driver. The computation of the drive variable takes place either in dependence upon the position signal of the first sensor or a minimum selection or a mean value of the position signals of both sensors or from the position signal of the second sensor.

To ensure the reliability of such a control system, it is necessary to check the measuring unit 10 or the two sensors 12, 22 as to their operational capability. A defective response of the measuring unit 10 can, for example, lead an unwanted acceleration of the motor vehicle.

Figure 2:
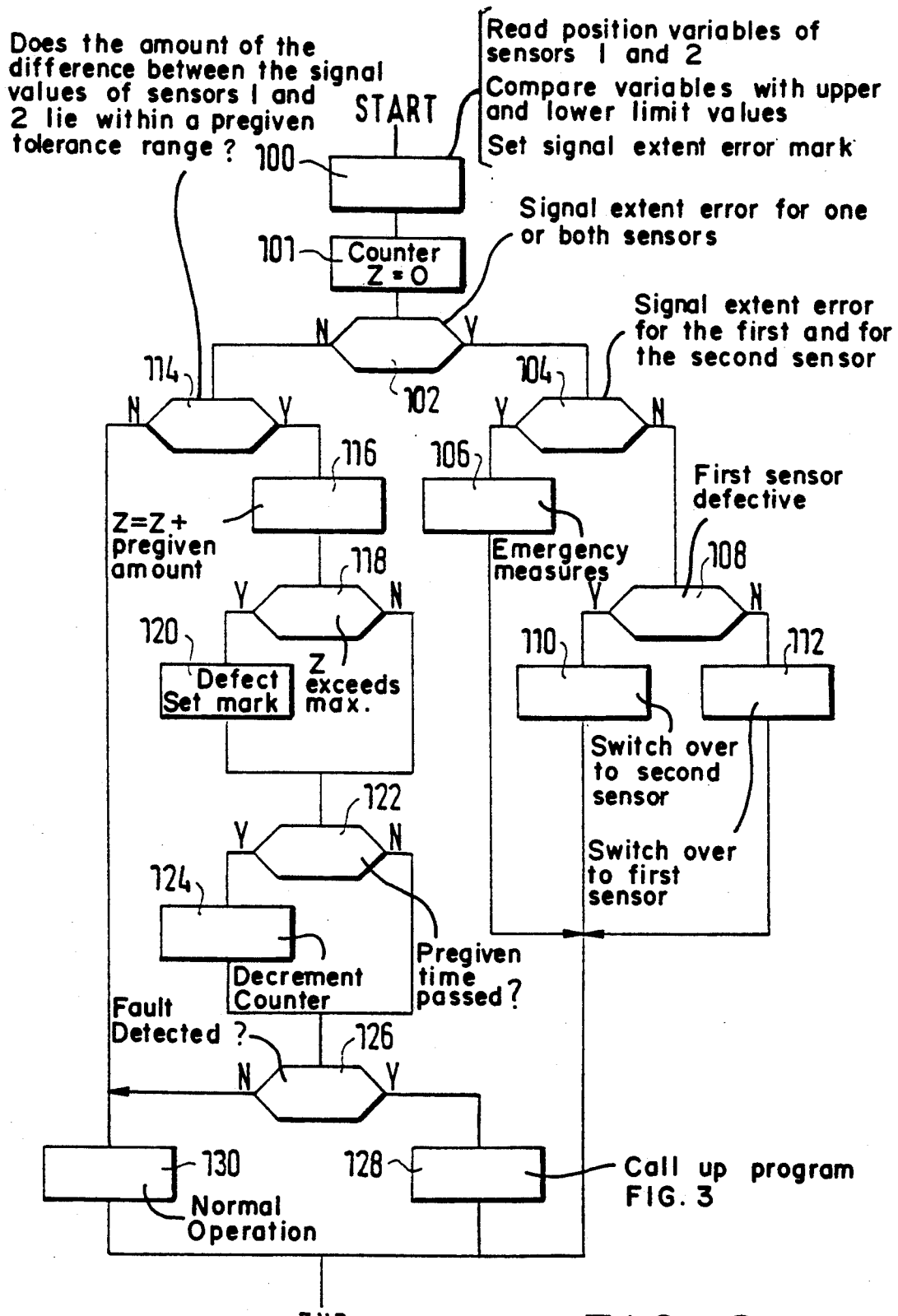
FIG. 2 is a flowchart which shows the procedure for checking the measuring unit; and, FIG. 3 is a flowchart for determining those sensors which are functionally operational.

The necessary steps for the check are carried out in the computer unit 72 and are described in FIGS. 2 and 3 together with the measures to be taken as a consequence thereof. The procedure described with respect to FIGS. 2 and 3 is applicable also to sensors detecting other parameters.

FIG. 2 shows a flowchart for evaluating the signal variables of the sensors. After the start of the program part, the signal variables of the sensors are read in in step 100 and compared sequentially with upper or lower permissible limit values and, when reaching or exceeding these limit values, a signal extent error of the particular sensor is detected and corresponding marks are set. In addition, it is possible to indicate the fault condition by means of a warning lamp and/or to store the same. In step 101, a counter Z is set to a start value such as zero and in the inquiry step 102, a check is made as to whether a signal extent error was determined for one or both sensors in step 100. If this is the case, the program proceeds further with step 104 and an inquiry is made as to whether, with two sensors, a fault condition was detected in step 100 for the first as well as for the second sensor. In this case, emergency measures are initiated pursuant to step 106. These emergency measures set the evaluated position signal of the sensors 12, 22 to zero position and provide an increased idle engine speed. Thereafter, the program part is ended and repeated as required.

If at least one sensor is operational, then after step 104 an inquiry is made in step 108 as to whether, for example, the first sensor is defective. In such a case, an emergency measure corresponding to step 110 is undertaken by switching over to the second sensor and the function of the control system 60 takes place exclusively in dependence upon the signal variable of the second sensor. After initiating the emergency measure according to step 110, the program part is ended and repeated as may be required. If the first sensor is operable according to step 108, it follows that the second sensor must be defective. This leads to the emergency measure in correspondence to step 112 in that the function of the control system 60 takes place in dependence upon the functionally operational first sensor. After step 112, the program part is likewise ended and repeated in a pregiven time.

If after the signal extent error check in correspondence to step 100, the decision is made in inquiry step 102 that no signal extent error is present, the program part continues with step 114. Here, a check is made as to whether the amount of the difference between the signal values of the first and second sensors lies outside of a pregiven threshold. In this way, it is possible to detect nonlinearities as a consequence of resistance changes of the resistance tracks or, for sharp characteristic deformations, short circuits or shunts and interruptions with stray resistances in the area of the particular sensor. If in correspondence to step 114, the amount of the difference is smaller than the pregiven threshold, that is, if this amount lies within a pregiven tolerance range, then in step 116, the counter Z is increased by a pregiven amount and the counter reading is compared in inquiry step 118 with a pregiven maximum value. When the maximum value is exceeded by the counter reading, a defect of the measuring unit is detected in step 120 and a corresponding mark is set. If the counter reading does not exceed the pregiven maximum value, then the program part continues in correspondence to the procedure of step 118.

After step 120, or step 118 in the case of a no-decision, a program segment is initiated which begins with the inquiry step 122. In step 122, an inquiry is carried out as to whether a pregiven time has passed which is substantially longer than a program run-through. If this is the case, the counter reading is decremented in step 124 if this reading is not zero. If the pregiven time duration has not passed, then the program continues directly with the inquiry step 126. There, a check is made if, in correspondence to step 120, a fault condition of the measuring unit was detected. If this is the case, then in step 128 the program part of FIG. 3 is called up with initialization of its parameters and the program part according to FIG. 2 is ended. If in correspondence to step 126, no fault condition is present, the program part continues with step 130. Step 130 determines the operability of the measuring unit 10 and indicates to the control system that normal operation is present. Thereafter, the program part is ended.

If the determination is made in step 114 that the amount of the difference between the signal values of the two sensors is less than the pregiven threshold, then there is a continuation with step 130 as described above and the program part is ended.

By evaluating the signal values according to the procedure according to FIG. 2, it is possible to detect signal extent errors of the particular sensor in correspondence to the steps 100 to 112 and to react correspondingly as well as, for nonlinearities or shunt faults, to carry out a fault detection which only then detects a fault condition when a pregiven number of checks of the difference amount has taken place with the detected fault condition within a pregiven time; that is, the fault has occurred with a pregiven frequency within a specific time.

A further improvement of the fault detection is achieved in this connection by means of different selection of resistance values for the resistors 46 and 54. For like faults at both sensors, for example shut faults of the wiper lines to one pole of the supply voltages, a fault detection is made possible according to the procedure corresponding to FIG. 2. Further, an indication of the fault condition can also be provided via a warning lamp and/or a storage of the detected fault condition.

If a fault condition occurs in correspondence to the steps 114 to 128, the program part according to FIG. 3 is initiated with the aid of which the functionally operable sensor can be determined.

After, in the step 128 of the program part according to FIG. 2, a start of the program part according to FIG. 3 is initiated with an initialization of the parameters (especially a setting of Marks VL1, VL2 and LL1, LL2 to the value 0), the signal variables of the sensors are read in step 200. In inquiry step 202, the signal variable of the first sensor, for example, is compared to a pregiven threshold value range. This threshold value range represents a value range which, for example, lies for a position transducer of a power-determining element of the internal combustion engine and/or of the vehicle in the vicinity of the full-load value or in the upper part-load range and starting from an individual value, the threshold value range is expanded about the tolerable deviations between the two sensor signal variables. If the signal variable of the first sensor reaches this threshold value range or exceeds the same, the first mark VL1 is set to 1 in step 204. If the signal variable is below the threshold value range, the program part is continued after step 204 with step 206.

In step 206, there is a continuation in an analog manner with the signal variable of the second sensor. If this signal variable is above the pregiven threshold range, then the mark VL2 is set to 1 in step 208. If the signal variable of the second sensor is below the pregiven threshold value range, there is a continuation after step 208 with step 210.

In the inquiry step 210, an inquiry is made as to whether one of the two VL marks is 1. If this is not the case, the program part is ended and started again. However, if in the steps 202 to 208, one of the two signal variables is detected as lying above the threshold, then in inquiry step 212, for example, the signal variable of the first sensor is compared with a corresponding threshold value range in the vicinity of the lower threshold value (in the embodiment of the position transducer, in the vicinity of the idle value). If the signal variable of this sensor is below this threshold value range, the mark LL1 is set to 1 in step 214. If the signal variable of the first sensor is greater than the lower threshold value range, then, after step 214, there is a continuation with inquiry step 216. There, as in step 212, the program part is continued with the signal variable of the particular other sensor, in the case of the embodiment of the second sensor. If the inquiry in step 216 provides that the signal variable of the second sensor is less than the lower threshold value range, the mark LL2 is set to 1 in step 218. In the other case, there is a continuation with step 220 after step 218.

The inquiries of steps 210 to 218 operate to detect whether the signal variable of the particular sensor reaches into the vicinity of the lower signal range; that is, in the preferred embodiment of its idle value. From this, together with the results of the steps 202 to 208, the conclusion is drawn as to the functional operability or functional inoperability of the particular sensors.

In the program steps following after the step 218, the determination is made as to which sensor is operable and corresponding measures are taken. Accordingly, in inquiry step 220, the inquiry is made as to whether all marks VL1, VL2 and LL1, LL2 have taken on the value 1. If this is the case, then corresponding to step 222, no decision is possible. After step 222, the program part is ended with the zero setting of the marks and, if required, started again.

If not all marks corresponding to the inquiry in step 220 are 1, then in step 224, the inquiry is made as to whether for the first sensor the mark VL1 has taken on the value 1 as well as the mark LL1. If this is the case, then the first sensor can be assumed to be operable and the function of the control system is continued according to step 226 based on the signal variable of the first sensor.

If in step 224 the determination is made that the condition set there for the sensor 1 is not fulfilled, then in step 228 a check is made for the second sensor as to whether the marks VL2 and LL2 have taken on the value 1. If this is the case, then the operation of the control system is undertaken according to the signal variable of the second sensor corresponding to step 230. For the opposite condition, there is no decision to be made and the program part is ended and restarted as required.

In summary, it can be stated that the procedure of the invention comprises the following steps. At the start, a check as to signal extent errors of the individual sensors of the measuring unit 10 takes place which, in the case of a fault condition of a sensor, leads to emergency measures in dependence upon the particular other sensor or other sensors; whereas, in the case of a fault condition of all sensors, an increased idle value is taken as an emergency condition. If no signal extent error is present, then further types of faults can be determined with the aid of signal variables such as the amount of their difference. After a pregiven number of inquiries with the result of a fault condition in a pregiven time duration, a second program part is called up which checks which sensor is operable and which sensor has a fault. For this purpose, and for a position transducer for the component influencing the power, threshold values in the region of the idle position and of a part-load position or full-load position of the component connected to the measuring unit are formed; otherwise, the threshold values are formed in the lower or in the mid-/upper sensor signal ranges, and a sensor then is detected as operable, if the signal variable of this sensor has dropped below the lower threshold value or has exceeded the upper threshold value. Emergency measures take place in dependence upon the operable sensor by switch-over to the particular sensor which is operable. The switch-over takes place preferably when the operable sensor has reached its idle position.

The embodiment is limited to a so-called double potentiometer; that is, a measuring unit with two sensors. The procedure of the invention can, however, by modification also be applied to measuring units which comprise several and especially three sensors.

It is understood that the foregoing description is that of the preferred embodiments of the invention and that various changes and modifications may be made thereto without departing from the spirit and scope of the invention as defined in the appended claims.

What is claimed is:

1. A system for electronically controlling an internal combustion engine of a motor vehicle by controlling a component influencing the power output of the engine, the system comprising:

a measuring unit having at least two sensors for generating first and second signal values, respectively, said signal values each being indicative of a single operating parameter of the engine or the vehicle;
   a control system for controlling the engine in dependence upon at least one of said signal values;
   said control system including computer means adapted for monitoring said signal values and utilizing said signal values for detecting an operational defect in at least one of said sensors; and,
   said computer means being further adapted for determining which one of said sensors is unaffected by said operational defect and for continuing the control of said engine utilizing the signal value of the unaffected sensor by emitting an output signal to said component influencing the power output of the engine.

2. The system of claim 1, wherein said operating parameter is the position of said component.

3. The system of claim 2, wherein said component includes an accelerator pedal.

4. The system of claim 1, wherein said computer means includes means for comparing the amount of the difference of said signal values to a pregiven threshold value to detect a malfunction of one of said sensors.

5. The system of claim 4, wherein said malfunction is only then determined when a pregiven number of checks of said amount of said difference has taken place in the presence of a detected malfunction.

6. The system of claim 1, wherein a malfunction of one of the sensors is detected only when said malfunction occurs within a pregiven time with a pregiven frequency.

7. The system of claim 1, wherein the sensor affected by an operational disturbance is determined when a malfunction occurs.

8. The system of claim 1, wherein the sensor uneffected by an operational disturbance is determined when a malfunction occurs.

9. The system of claim 1, said computer means including means for initiating steps when a malfunction is detected for determining when a pregiven lower threshold is reached or exceeded in a signal range of the sensor selected from the lower signal range, mid-signal range and maximum signal range.

10. The system of claim 9, wherein said one sensor is detected as being operable when the signal value of the particular sensor has at least once reached or exceeded the lower as well as the upper threshold value or range.

11. The system of claim 10, said upper and lower threshold values being configured as value regions which are derived from a fixed pregiven value and a range formed from the tolerable deviations of the sensor signal variables.

12. The system of claim 9, wherein the engine is controlled in dependence upon the signal of said one sensor.

13. The system of claim 11, wherein said measuring unit includes a plurality of sensors and wherein a malfunction of one of the sensors is detected only when said malfunction occurs within a pregiven time with a pregiven frequency and said system further comprising:

means for detecting a malfunction of the sensors defining said measuring unit by comparing the amount of the difference of said signal values to a threshold;
   means for detecting the functionally operable sensors when said malfunction occurs; and, means for controlling said control arrangement in dependence upon the functionally operable sensors when said malfunction occurs by a switch-over to the sensors determined as being functionally operable.

14. The system of claim 13, said sensors being position transducers associated with said component of the engine or of the motor vehicle and said switch-over occurs in the region of the idle value of the functionally operable sensors.

15. The system of claim 13, said system further comprising means for setting the signal values of all of said sensors to zero and operating the engine at an increased idle engine speed when all of said sensors become functionally inoperable.

* * * * *

UNITED STATES PATENT AND TRADEMARK OFFICE
CERTIFICATE OF CORRECTION

PATENT NO. : 5,170,769

DATED : December 15, 1992

INVENTOR(S) : Joachim Berger, Reinhard Fenchel, Thomas Küttner, Dieter Seher and Klaus Bleuel It is certified that error appears in the above-identified patent and that said Letters Patent is hereby corrected as shown below:

In the title page, under "Foreign Patent Documents": delete "002974   2/1987   Japan .................. 123/691" and substitute therefor
-- 0029742   2/1987   Japan .................. 123/691 --.

In column 3, line 31: between "the" and "measuring", delete ",".

In column 5, line 67: delete "shut " and substitute -- shunts -- therefor.

In column 6, line 14: between "in" and "step 200", insert -- in --.

Signed and Sealed this

Nineteenth Day of October, 1993

*Attest:*

BRUCE LEHMAN

*Attesting Officer*    Commissioner of Patents and Trademarks